(12) United States Patent
Pellin et al.

(10) Patent No.: US 8,258,398 B2
(45) Date of Patent: Sep. 4, 2012

(54) HETEROJUNCTION PHOTOVOLTAIC ASSEMBLED WITH ATOMIC LAYER DEPOSITION

(75) Inventors: Michael J. Pellin, Naperville, IL (US); Jeffrey W. Elam, Elmhurst, IL (US); Ulrich Welp, Lisle, IL (US); Alex B. F. Martinson, Evanston, IL (US); Joseph T. Hupp, Northfield, IL (US)

(73) Assignee: UChicago Argonne, LLC, Chicago, IL (US)

( * ) Notice: Subject to any disclaimer, the term of this patent is extended or adjusted under 35 U.S.C. 154(b) by 390 days.

(21) Appl. No.: 11/823,789

(22) Filed: Jun. 28, 2007

(65) Prior Publication Data

US 2009/0000660 A1    Jan. 1, 2009

(51) Int. Cl.
*H01L 31/00* (2006.01)
(52) U.S. Cl. .......................... 136/263; 136/256
(58) Field of Classification Search ........... 136/243–265
See application file for complete search history.

(56) References Cited

U.S. PATENT DOCUMENTS

| | | | |
|---|---|---|---|
| 6,649,824 B1 * | 11/2003 | Den et al. | 136/256 |
| 2005/0009224 A1 * | 1/2005 | Yang et al. | 438/57 |
| 2005/0098205 A1 * | 5/2005 | Roscheisen et al. | 136/263 |
| 2008/0072961 A1 * | 3/2008 | Liang et al. | 136/263 |

OTHER PUBLICATIONS

Min et al., Semiconductor nanowires surrounded by cylindrical Al2O3 shells, Journal of Electronic Materials, vol. 32, No. 11, Nov. 1, 2003, pp. 1344-1348.*
Nanu e tal., "Solar-Energy Conversion in $TIO_2/CuInS_2$ Nanocomposites", Advanced Functional Matters, pp. 95-100.
Law et al., "$ZnO—Al_2O_3$ and $ZnO—TiO_2$ Core—Shell Nanowire Dye-Sensitized Solar Cells", American Chemical Society, 12 pages.

* cited by examiner

*Primary Examiner* — Jessica L Ward
*Assistant Examiner* — Kevin E Yoon
(74) *Attorney, Agent, or Firm* — Foley & Lardner LLP

(57) ABSTRACT

A heterojunction photovoltaic cell. The cell includes a nanoporous substrate, a transparent conducting oxide disposed on the nanoporous substrate, a nanolaminate film deposited on the nanoporous substrate surface, a sensitizer dye disposed on a wide band gap semiconducting oxide and a redox shuttle positioned within the layer structure.

8 Claims, 6 Drawing Sheets

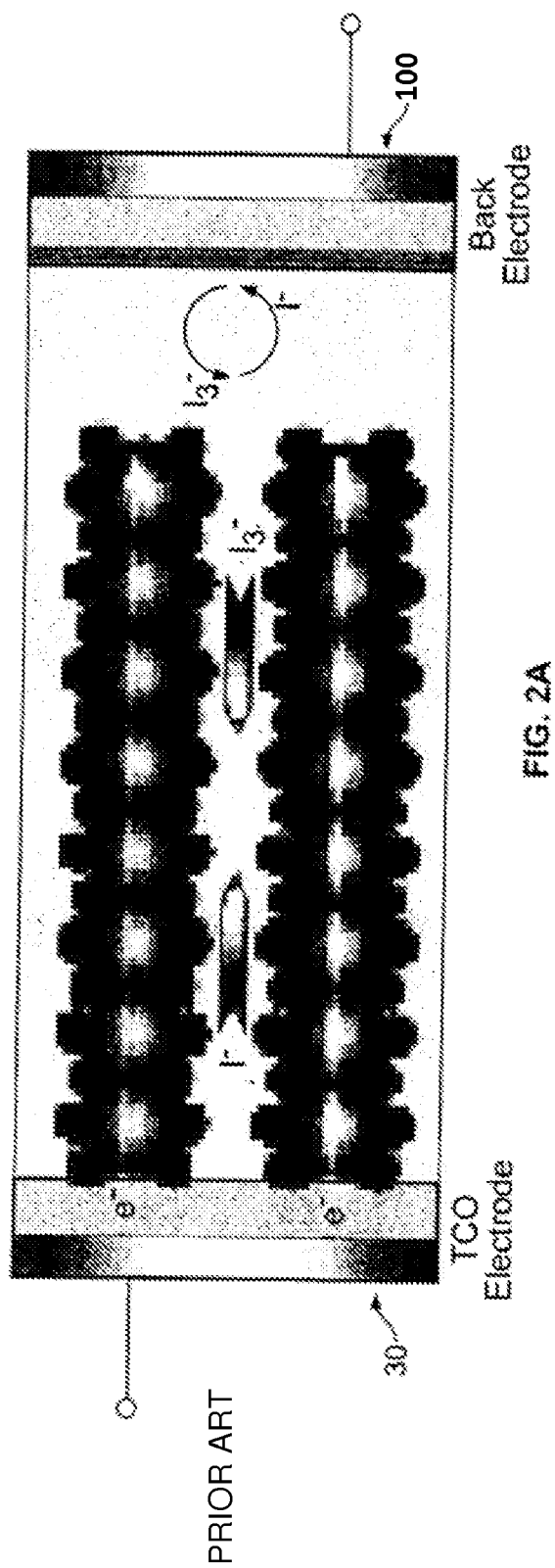
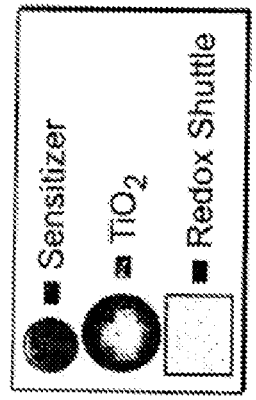
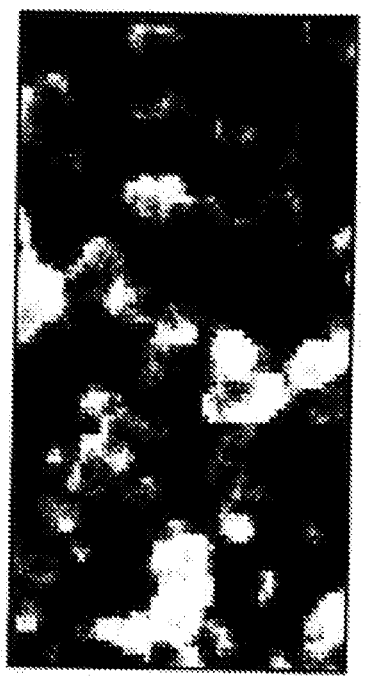
FIG. 2A
PRIOR ART
FIG. 2B
PRIOR ART

AAO/TCO/TiO$_2$/Dye

AAO/TCO/TiO$_2$/Dye/Alumina

HETEROJUNCTION PHOTOVOLTAIC ASSEMBLED WITH ATOMIC LAYER DEPOSITION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

The present invention is directed to an article of manufacture and method for producing photovoltaic energy. More particularly, the invention is related to an article of manufacture based on a nanoporous substrate of high surface area and further having a thin, well controlled conducting and also semi-conducting oxide layers deposited by atomic layer deposition enabling creation of a highly efficient solar cell and photon conversion medium. Further, the coated nanoporous component is arranged in a photovoltaic device structure so as to drastically reduce the photoelectron diffusion path and diffusion time to a transparent conducting oxide electrode which greatly improves collection efficiency.

BACKGROUND OF THE INVENTION

Since the mid 1980's it has been clear that dyes (and later other sensitizers such as quantum dots) attached to semiconductor surfaces such as $TiO_2$ efficiently inject charge into the semiconductor conduction band when photoexcited. Since that development, it has been widely recognized that with such heterojunctions, appropriately arranged with a conducting electrode and counter electrode, might enable construction of efficient solar cells. These architectures were termed sensitized solar cells (SSC hereinafter).

The electronic band structure of such an SSC cell is depicted in FIGS. 1A and 1B. In such an SSC cell, light enters from the left side of the page and is transmitted through both the transparent conducting oxide (hereinafter, TCO) anode and also the wide band gap semiconducting oxide (shown as $TiO_2$ in this case, but could be any of a variety of known semiconducting oxides including, without limitation, $ZrO_2$, ZnO, and $Nb_2O_5$). The light is adsorbed by a sensitizer molecule dye chemically attached to the $TiO_2$ layer (depicted in FIG. 1A as a wavy line labeled hv). The dye is chosen such that the excited state electron affinity is much less than the ground state. In femtoseconds the dye donates its electron to the $TiO_2$ conduction band. The electron migrates through the $TiO_2$ reaching the anode where it can be used for work. The now reduced dye is regenerated by accepting an electron from a redox shuttle molecule available in solution (typically this involves a $3I^-/I_3^-$ conversion with the oxidation of two dye molecules. Ultimately the redox shuttle is regenerated at the back electrode. Thus, a wire connecting the TCO and the back electrode sees current flow.

While the solar cell described in FIG. 1A is extremely efficient for each photo-absorbed, useful devices with this architecture have not been made because the absorbance of a single monolayer of sensitizer molecule dye is vanishingly small (of the order of 1 photon in 1000).

Researchers have subsequently attempted to increase the heterojunction absorbance by simply increasing the loading of the sensitizer molecule. This approach was however quickly abandoned when it was realized that although the absorbance increased in such cells, the efficiency per photon dropped precipitously. Ultimately it was demonstrated that only the first monolayer of dye would efficiently inject electrons into the $TiO_2$, all other layers simply lost excitation by generating heat.

The first successful cells based on these heterojunction ideas came from Michael Gratzel's laboratory in Switzerland. Here the absorbance was increased by using a compressed nanoparticle array of $TiO_2$ particles coated with a sensitizer dye as depicted in FIG. 2B. This arrangement meant that photons had to traverse nearly 1500 monolayers of dye rather than one, yet maintained the arrangement of a monolayer of dye on $TiO_2$ and consequently maintained the efficient injection of photoelectrons.

When this architecture was first announced, Gratzel produced cells of ~10% efficiency and created a sensation. The subsequent flurry of studies has in many ways justified the excitement. Degradation studies for instance have demonstrated that Gratzel photocells have a mean operating life measured in decades. Cost studies have demonstrated that Gratzel photocells are significantly cheaper, made of more abundant material, and are easier to produce than Si based photovoltaics. Thus, if the efficiency of such cells could be raised to about 15%, it is likely that they would totally replace Si cells. This promise has lead to the establishment of a number of companies focused on producing panels of Gratzel photocells and generating many significant public demonstrations (see for instance website http://www.dyesol.com).

Unfortunately, Gratzel photocell efficiencies have increased only marginally (10%->11.2%) in the past decade despite theoretically possible efficiencies approaching 30%. However, the reason for this lack of progress is now clear. Injected photoelectrons have a long and slow path to travel in the $TiO_2$ nanoparticle array in order to find the TCO electrode. During this traverse, which may require seconds, there are many opportunities for losses which in fact do occur at the electrolyte $TiO_2$ interface (see FIG. 2A). As currently constituted, cell efficiencies represent a careful balance between electron drive (voltage loss) and electron recombination (current loss) which is fully optimized. These interfacial losses then result in greatly diminished efficiency relative to theoretical efficiencies.

SUMMARY OF THE INVENTION

The article of manufacture of a heterojunction photovoltaic cell is constructed to overcome the above-described prior art deficiencies by first creating a photoabsorption area which enables a large number (such as $10^3$ or more) opportunities for photoabsorption by a dye monolayer. Further, the heterojunction is arranged such that the photoelectron carrier path length for collection is shortened by a factor of about $10^3$ and the diffusion time reduced by about $10^6$. The thin film conductor and semiconductor architecture forming the foundation for the cell employs a nanoporous substrate, such as anodic aluminum oxide (hereinafter "AAO") or aerogels. Atomic layer deposition (hereinafter "ALD") can then be used to form highly uniform, thin layers of conducting and semiconducting oxides on the large surface area of the AAO substrate (or otherwise high surface area substrate). In a preferred form of the invention the architecture comprises an array of hollow wires with the wire cross section made up of an array of concentric hollow cylinders. A base TCO electrode comprised of $F:SnO_2$ (tin oxide doped with fluorine) was formed by spray pyrolysis which closes the porous AAO network on a bottom surface. The preferred method of preparation includes using ALD to deposit a nanolaminant of a film of about 10 nanometers of $Sb:SnO_2$ (tin oxide doped with antimony), a transparent conducting oxide disposed under about 10 nm of $TiO_2$ along the entire AAO pore structure and an exposed layer of $F:SnO_2$. These nanowires are then coated with a photoabsorbent dye disposed inside the wire. This architecture further includes a redox shuttle, such as a solution of $3I^-/I_3^-$ and a platinum anode. Further improvements in performance can be gained by using ALD to apply additional layers such as insulating $Al_2O_3$ layers to prevent the recombination of electrons in the $TiO_2$ with holes in the electrolyte as will be described below.

These features and other aspects of the invention will be described in more detail hereinafter with reference to the figures described below.

BRIEF DESCRIPTION OF THE DRAWINGS

FIG. 2A illustrates a conventional Gretzel solar cell and FIG. 2B shows $TiO_2$ particles coated with a sensitizer dye;

FIG. 3C illustrates a cross section of two nanowires including an additional NiO layer to replace the liquid electrolyte;

DETAILED DESCRIPTION OF PREFERRED EMBODIMENTS

Figure 3A:
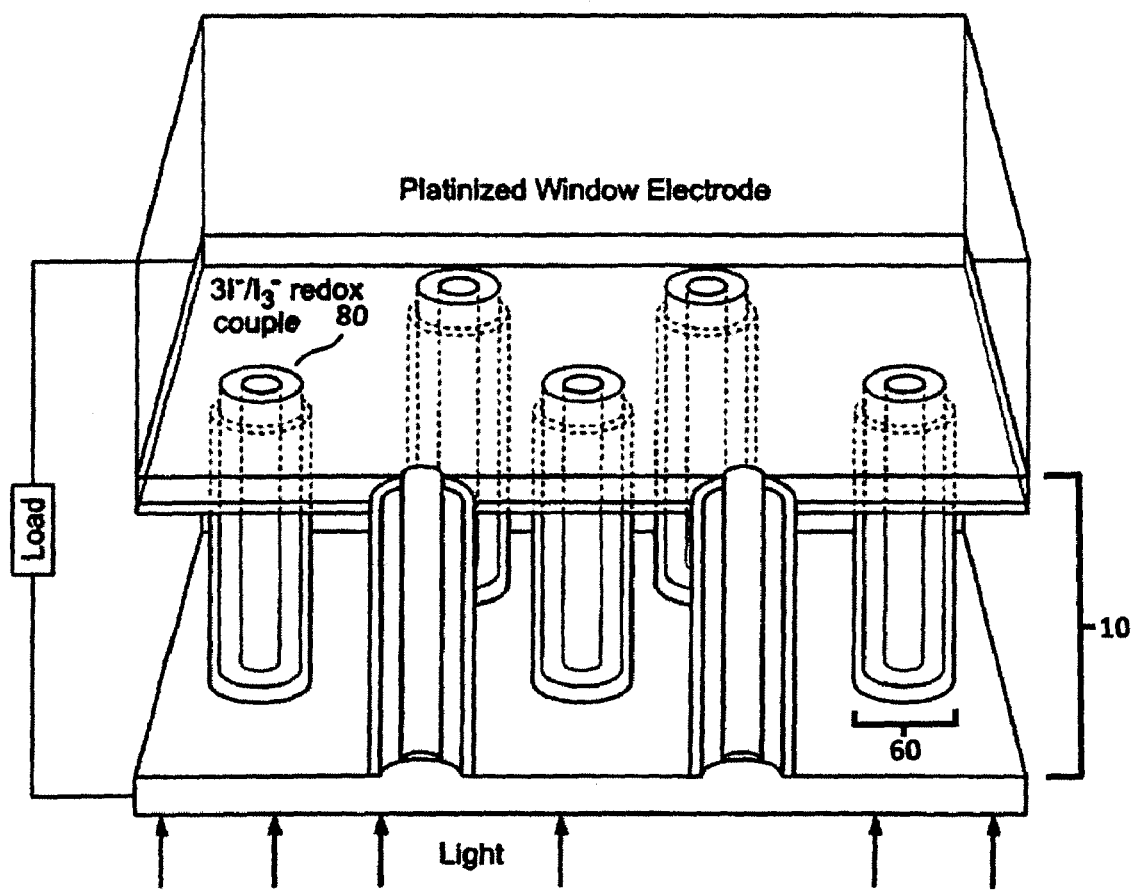
FIG. 3A illustrates a perspective view of the architecture of a preferred embodiment of a solar cell.
Figure 3B:
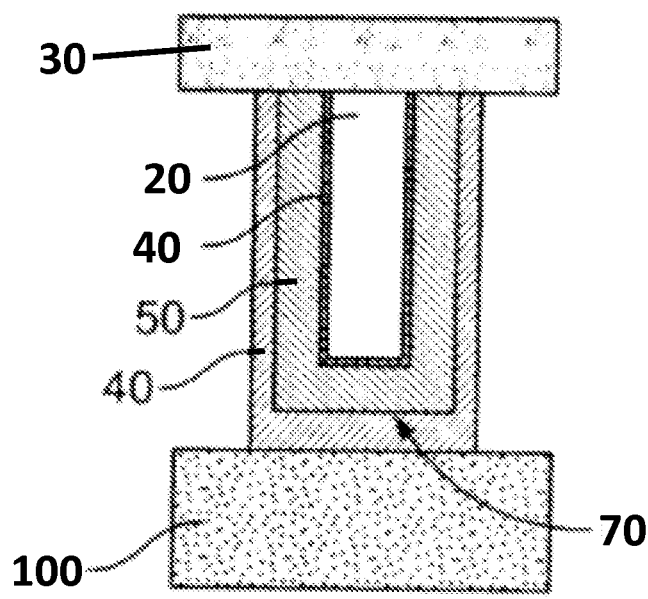
FIG. 3B illustrates a partial section of a nanowire and FIG. 3C illustrates a cross section of the nanowire of FIG. 3B.
Figure 3C:
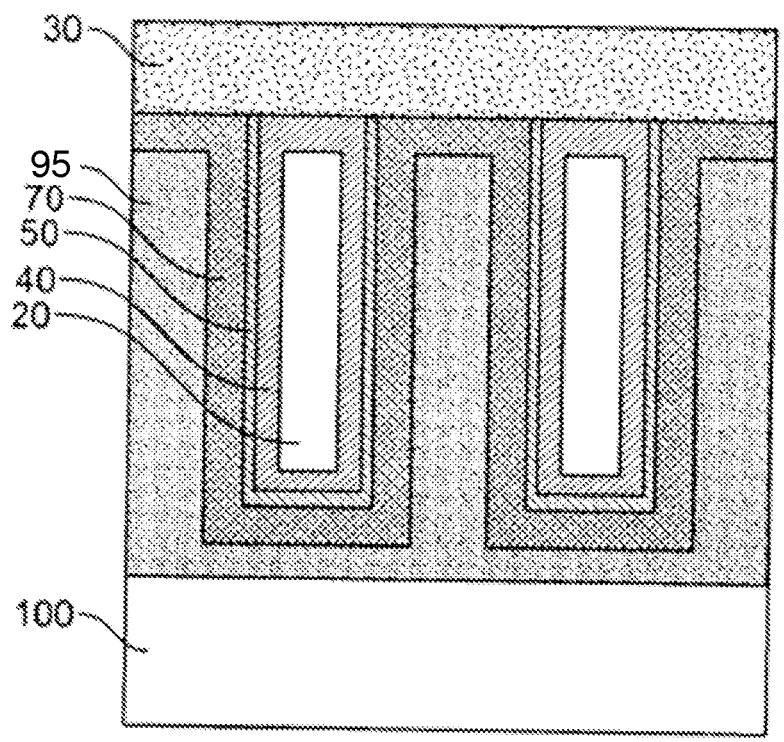

A thin film semiconducting oxide architecture 10 of a heterojunction photovoltaic cell constructed in accordance with the invention is illustrated in FIGS. 3A-3C. The most preferred form of the thin film semiconducting oxide architecture 10 is based on readily available nanoporous substrates 20, such as AAO described hereinafter, or aerogels. The deposition of thin layers of TCO 30 or other desirable components can be achieved most preferably by ALD which allows atomic layer by layer control of the thickness and composition of the semi-conducting oxide 50 as well as the transparent conducting oxide 40 on the nanoporous substrate 20 of AAO or aerogel substrates. For an AAO substrate for instance, the architecture produced is a uniform array of hollow wires. Each wire cross-section is made up of an array of concentric hollow cylinders.

Figure 4:
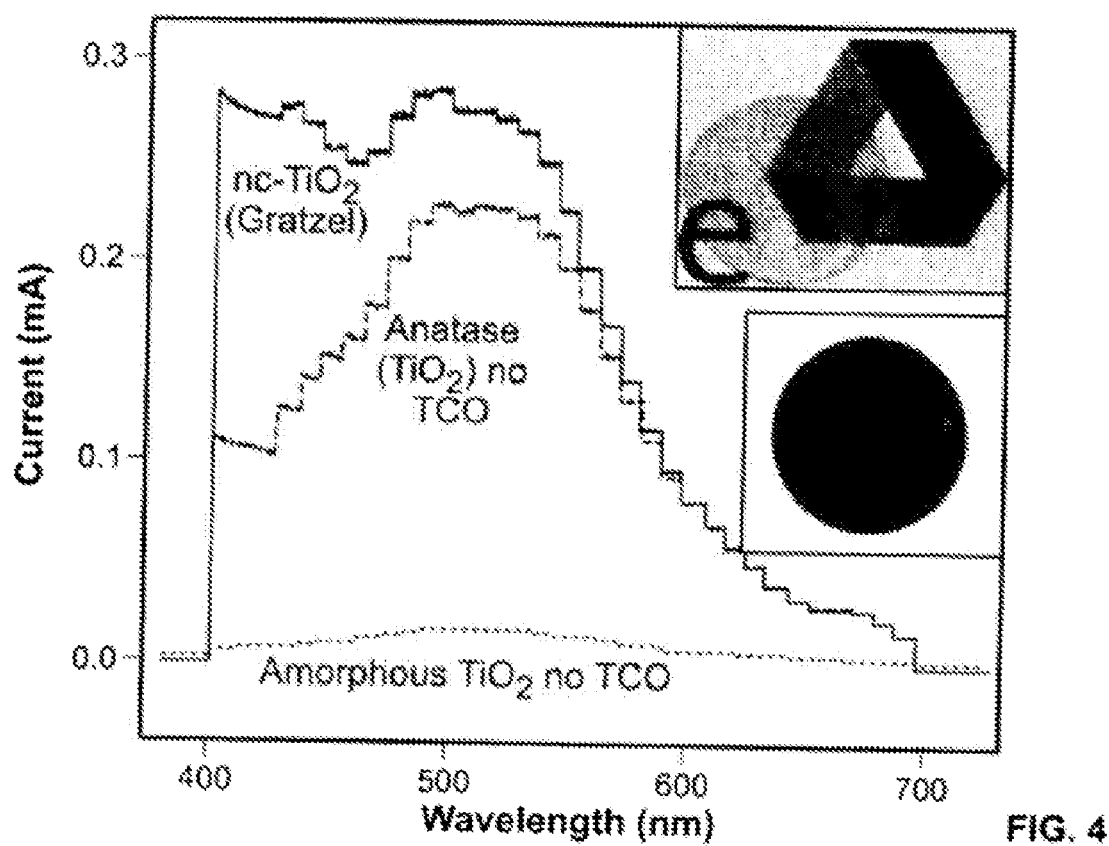
FIG. 4 illustrates a plot of photocurrent generated by an ALD coated AAO nanowire cell such as shown in FIG. 3A and compared with a nanocrystalline DSSC cell similar to a Gretzel cell and also shown is photocurrent from an amorphous $TiO_2$ with no TCO.

Disks of the AAO substrate 20 have been prepared with a thickness of 60 μm with hexagonal arrays of vertically aligned, 100 nm (+−3 nm) pores and with a cell density exceeding $1 \times 10^{10}$ cm$^{-2}$. Thus, initially at least the AAO substrate 20 has a surface area in excess of about 1500 times that of a flat film, equivalent to the roughness factor achieved in the best nanoparticle based SSCs. The AAO substrate 20 is transparent over a wide wavelength range, adding no adsorptive losses to the solar cell of the architecture 10. In our first experiments, the AAO substrate 20 was coated on its bottom surface with a thick TCO electrode 30, such as for example,
$F:SnO_2$. This was done by spray pyrolosis, closing the pore network at this end and forming the TCO electrode 30. Then, the ALD method was used to uniformly and completely deposit a nanolaminate film, such as for example, a 6 nm film of $Sb:SnO_2$ (also a TCO) 40 under a 10 nm $TiO_2$ film 50 along the entire AAO pore structure and the exposed $F:SnO_2$ of the TCO electrode 30. Additional examples of TCO electrode 30 include but are not limited to aluminum-doped zinc oxide, indium doped with tin, zinc, or combinations of tin and zinc, and antimony-doped tin oxide. These resulting nanowires 60 were then coated with a sensitizer dye 70, such as a N719 dye, on the inside of the wire 60 by conventional impregnation. The resulting complete architecture 10 is illustrated in detail in FIG. 3A. Addition of the $3I^-/I_3^-$ redox shuttle 80 and an anode 100 as in FIG. 3C (preferably Pt) produced an efficient nanowire SSC as shown by the performance data in FIG. 4. The interdigitated design of the architecture 10 produced higher photo current (from decreased electron losses) due to photoelectron transport distance reduction from the 10-20 μm typical of nanoparticle DSSC's to a few tens of nms without sacrificing the large specific surface area necessary for complete photon absorption.

In addition to the preferred embodiment described hereinbefore, there are many parameters that can be varied in the architecture 10 proposed herein. Those include, without limitation, the length, thickness, morphology, and composition of each component layer, interfaces between layers can be extraordinarily abrupt or graded, and the final surface produced has a dense array of attachment moieties providing for interesting opportunities in dye quantum dot coupling to the framework.

ALD can coat many nanocrystalline frameworks in addition to coating of aerogels described hereinbefore. Because the filaments which make up the preferred aerogel substrate 20 expand with each new atomic layer, the surface area of the material increases; and this allows the synthesis method to intrinsically determine the best surface area to use. Further coating of aerogel substrate 20 makes initially delicate substrates able to withstand capillary forces. Because of their extremely large surface area, the aerogel substrate 20 represent a highly preferred substrate for the SSC type of solar cells for manufacture. In all other respects the same arguments for AAO apply here. One extension of this concept would be to place the aerogel substrate 20 inside a more robust macroporous material, such as microchannel plates.

Figure 1A:
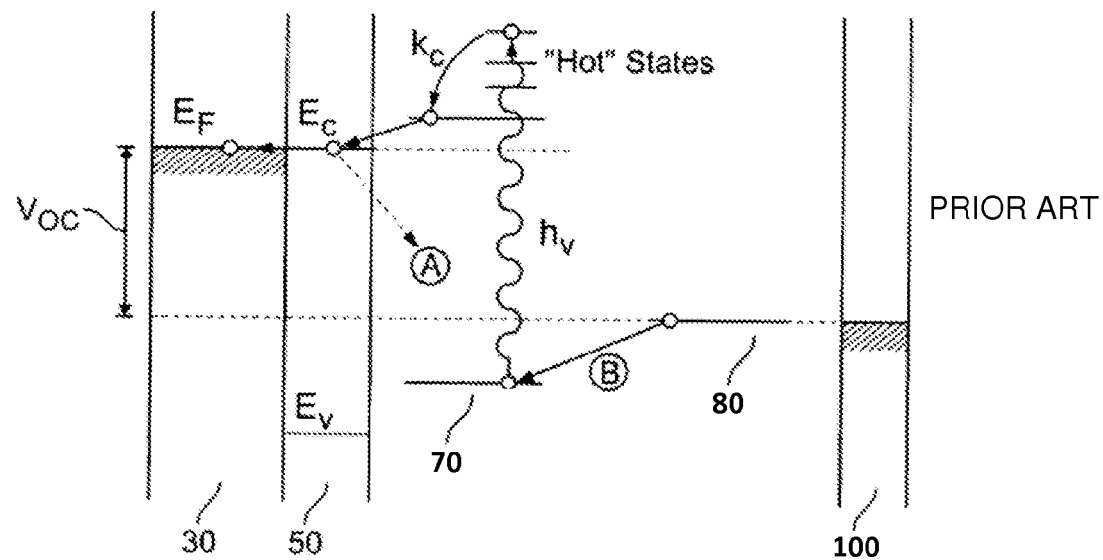
FIG. 1A illustrates electronic band structure of a conventional sensitized solar cell.

The capability of inserting thin and ultra-thin $TiO_2$ and TCO layers enables new approaches to the design and study of SSCs generally. In the existing SSCs, photogenerated electrons travel in an ambipolar diffusion process through the nanoporous $TiO_2$ layer requiring times of millisecond up to seconds. During this time period the photoelectron is susceptible to loss via various recombination mechanisms imposing very stringent requirements on the cell design. In particular, the $3I^-/I_3^-$ redox shuttle 80 is indispensable due to its slow electron re-capture rate. However, the $3I^-/I_3^-$ redox shuttle 80 has a roughly 0.6 V potential mismatch with respect to the most commonly used sensitizer dyes, incurring the single largest loss mechanism in present cells (see FIG. 1A). In the architecture 10, diffusion lengths are reduced by about $10^3$ and diffusion times are reduced by about $10^6$. This can enable use of alternative forms of the redox shuttles 80 with better matched potentials such as $3Br^-/Br_3^-$; $2SeCN^-/SeCN_2^-$ and various $CoL_3$ couples.

This new synthesis method also allows the redox shuttle 80 itself to be removed (see FIG. 3C) by over-coating the sensitizer dye 70 with a hole-transporting wide-band gap semiconductor, such as NiO 95 and adding the back electrode 100 that may be a metal or another TCO creating an all-solid-state type of SSC. This form of the architecture 10 would solve many of the safety issues associated with these toxic solvents and chemicals. In addition, by using a TCO for the back electrode 100, the entire cell would be transparent and would allow stacking of multiple cells to form tandem structures.

Figure 1B:
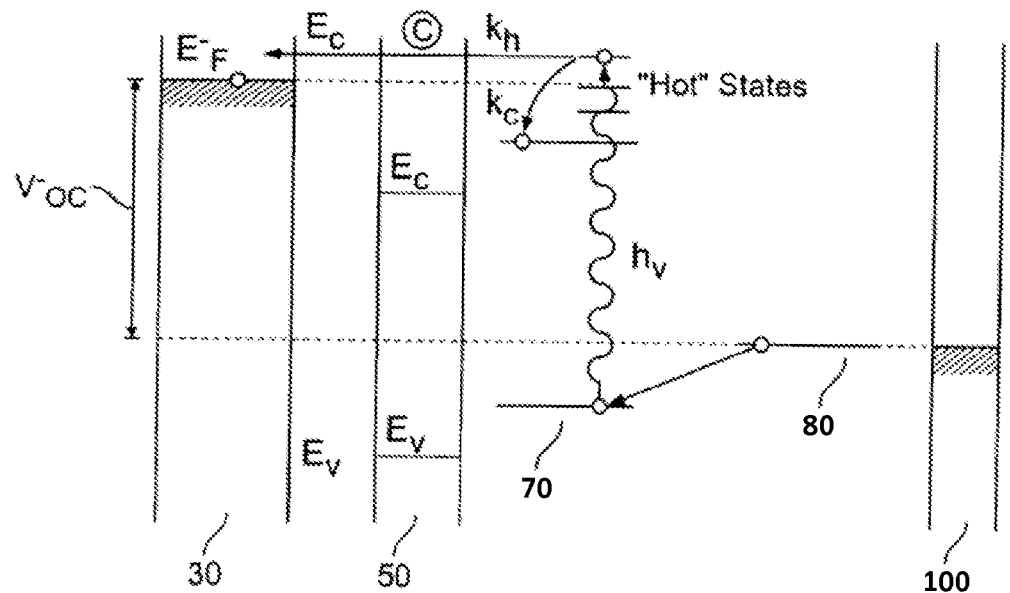
FIG. 1B illustrates the electronic band structure of one preferred form of a solar cell invention.

The new synthesis method also enables the synthesis of structures with ultrathin semiconducting oxide layers. This can be extremely important since such layers would allow hot electrons to transport through them into the TCO layer 30 without the loss of their original energy. The capture of hot electrons holds the promise of increasing the efficiency of solar cells beyond the Queisser-Shockley limit. Under ideal conditions, hot electron capture resembles an infinite stack of single threshold junctions that is matched to the solar spectrum, thus approaching an efficiency of 65%. Hot electrons arise when upon absorption of a photon the energy of the sensitizer is higher than its relaxed excited state (see FIGS. 1A and 1B). This excess energy is in the case of dye sensitizers associated with vibrational modes of the molecule whereas in the case of quantum dot sensitizers it corresponds to higher excited electron states in the confinement potential. In order to harvest this excess energy the rate of electron injection from the "hot" states into the $TiO_2$ film 50 ($k_h$ in FIG. 1B) has to be faster than the rate of cool down to the relaxed state of the dye 70 and to the S-state of the quantum dot ($k_c$ in FIG. 1B), respectively. Ultra-fast pump-probe spectroscopy has yielded evidence for the injection of hot electrons from dyes into colloidal $TiO_2$ nanocrystals.

In regard to the improved method of manufacture, this synthesis method allows in the hot electron context careful control of barrier widths (in the single monolayer range) and careful control of barrier heights. This control extends beyond controlling the materials to include the ability to deposit intimately mixed compound oxides. Such oxides have intermediate band heights. A further variation on this idea is to use ALD's ability to use chemistry to deposit polycrystalline materials at very low temperatures, thus being able to adjust band edges by crystal type (for example, anatase vs rutile $TiO_2$).

Figure 5A:
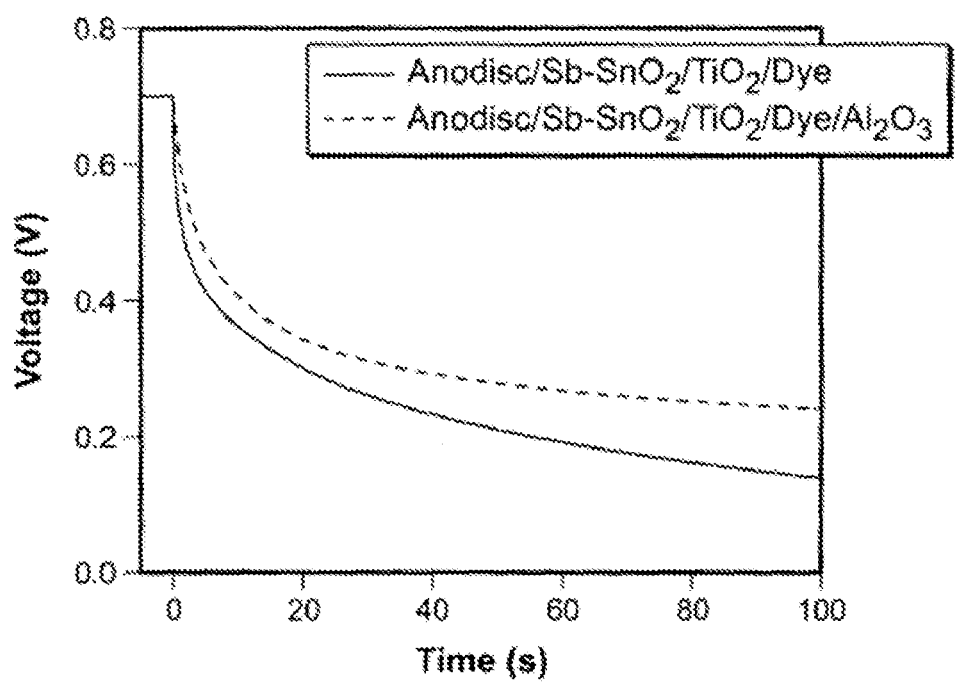
FIG. 5A illustrates a comparison of voltage decay over time different embodiments of the invention.
Figure 5B:
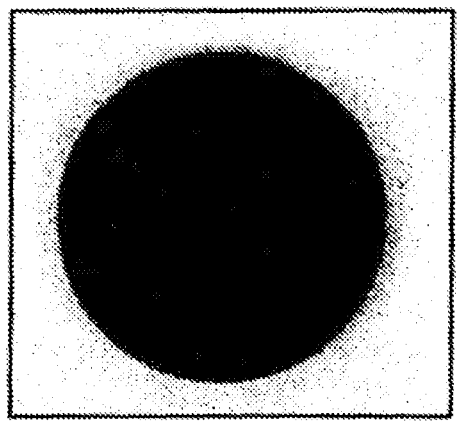
FIG. 5B shows a solar cell architecture comprised of AAO/TCO/$TiO_2$/dye and FIG. 5C shows improvement by the addition of an alumina layer over FIG. 5B.
Figure 5C:
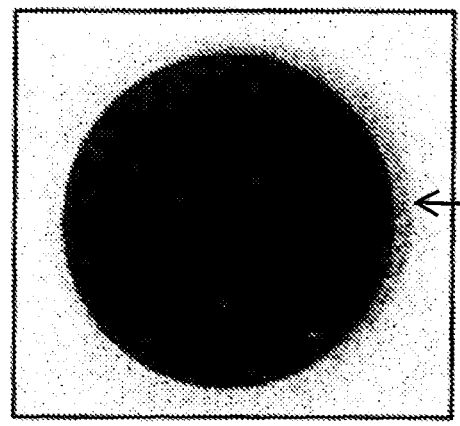

In yet another embodiment of the invention, one can address the problem of the long time exposure of electrons to loss as transport occurs in the $TiO_2$ framework. While the ALD method is conventionally thought to coat everywhere, for greasy molecules such as the dyes used on the surface of SSCs, we have determined that ALD can coat around the sensitizer dye molecules. If for instance we coat with alumina, then the sensitizer dye 70 is still exposed to the redox shuttle 80 and attached to the $TiO_2$ surface 50. In principle then its operation as a sensitizer dye is unaffected. However, the rest of the $TiO_2$ surface will be insulated from the electrolyte, dramatically decreasing the loss of electrons. We have demonstrated this technique as shown in FIGS. 5A-5C. The inset shows two separate photocells, one photocell in FIG. 5B as described for FIGS. 2A and 2B, and one in FIG. 5C with an additional alumina layer 75 deposited on the $TiO_2$ layer around the dye molecules. Clearly low temperature deposition of alumina has not bleached the sensitizer dye. The time curves in FIG. 5A show the lifetime of electrons in the structure. The alumina coated system has significantly increased electron lifetimes indicating significantly improved electron loss properties.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A heterojunction photovoltaic cell, comprising:
   a nanoporous substrate having a substrate surface;
   a transparent conducting oxide disposed on at least a portion of the nanoporous substrate to faun a first electrode;
   a semiconductor oxide layer having a wide band gap and disposed adjacent the transparent conducting oxide;
   a nanolaminate film deposited on the substrate surface, and the nanoporous substrate, the transparent conducting oxide and the nanolaminate film forming a nanowire;
   a sensitizer dye having sensitizer dye molecules and, disposed on at least a portion of an interior portion of the nanowire; and
   an insulating alumina layer deposited on the interior portion of the nanowire between the sensitizer dye molecules and onto exposed portions of the semiconductor oxide layer, such that the sensitizer dye molecules are not coated with the alumina layer;
   a redox shuttle layer coupled to the sensitizer dye and the insulating alumina layer coating being between the molecules of the sensitizer dye which are thereby exposed to the redox shuttle layer adjacent thickness-wise the sensitizer dye and attached to the semiconducting oxide layer, thereby enabling the sensitizer dye to function unaffected, but insulating other areas of the semiconductor oxide layer in contact with the redox shuttle, thereby decreasing loss of electrons from recombination.

2. The cell as defined in claim 1 wherein the nanoporous substrate comprises an anodic aluminum oxide.

3. The cell as defined in claim 1 wherein the transparent conducting oxide comprises at least one of $SnO_2$, $F:SnO_2$, $Sb:SnO_2$, $ZnO$, $Al:ZnO$, $In_2O_3$, $Sn: In_2O_3$, $Zn: In_2O_3$, and $Zn-Sn: In_2O_3$.

4. The cell as defined in claim 1 wherein the semiconducting oxide layer is selected from the group consisting of $TiO_2$, $ZrO_2$, $ZnO$ and $Nb_2O_5$.

5. The cell as defined in claim 1 further including an anode coupled to the nanowire.

6. The cell as defined in claim 1 wherein the nanoporous substrate comprises micro-channel plates.

7. The cell as defined in claim 1 wherein the redox shuttle is selected from the group consisting of $3I^-/I_3^-$, $3Br^-/Br_3^-$; $2SeCN^-/SeCN_2^-$ and $CoL_3$ couples.

8. The cell as defined in claim 1 wherein the redox shuttle comprises a hole-transporting, wide band gap semiconductor overcoated onto the sensitizer dye and a coupled transparent conducting oxide layer.

* * * * *

UNITED STATES PATENT AND TRADEMARK OFFICE
CERTIFICATE OF CORRECTION

PATENT NO. : 8,258,398 B2
APPLICATION NO. : 11/823789
DATED : September 4, 2012
INVENTOR(S) : Michael J. Pellin et al.

Page 1 of 1

It is certified that error appears in the above-identified patent and that said Letters Patent is hereby corrected as shown below:

In the Claims

Column 6, Claim 1, Line 19, "faun" should be -- form --.

Column 6, Claim 1, Line 25, "and," should be -- and --.

Column 6, Claim 8, Line 57, "shuttle comprises," should be -- shuttle layer comprises --.

Signed and Sealed this
Thirteenth Day of August, 2013

Teresa Stanek Rea
*Acting Director of the United States Patent and Trademark Office*